United States Patent [19]

Obayashi et al.

[11] Patent Number: 4,471,655
[45] Date of Patent: * Sep. 18, 1984

[54] GAS FLOW RATE MEASURING APPARATUS

[75] Inventors: Hideki Obayashi, Okazaki; Tokio Kohama, Nishio; Hisasi Kawai, Toyohashi; Tsuneyuki Egami, Aichi, all of Japan

[73] Assignee: Nippon Soken, Inc., Nishio, Japan

[*] Notice: The portion of the term of this patent subsequent to Nov. 9, 1999 has been disclaimed.

[21] Appl. No.: 312,983

[22] Filed: Oct. 20, 1981

[30] Foreign Application Priority Data

Oct. 24, 1980 [JP] Japan ............................ 55-149815
Oct. 24, 1980 [JP] Japan ............................ 55-149816
Oct. 24, 1980 [JP] Japan ............................ 55-149817

[51] Int. Cl.³ .............................................. G01F 1/68
[52] U.S. Cl. ..................................................... 73/204
[58] Field of Search ........................... 73/204, 118 A

[56] References Cited

U.S. PATENT DOCUMENTS

| | | | |
|---|---|---|---|
| 1,902,427 | 3/1933 | Sawyer | 73/204 |
| 3,246,515 | 4/1966 | Martino | 73/204 |
| 3,648,518 | 3/1972 | Han et al. | 73/204 |
| 3,677,085 | 7/1972 | Hayakawa | 73/204 |
| 3,975,951 | 8/1976 | Kohama et al. | 73/204 |
| 4,011,756 | 3/1977 | Lemos | 73/204 |
| 4,244,217 | 1/1981 | Ledbetter | 73/204 |
| 4,357,830 | 11/1982 | Kohamaa et al. | 73/204 |

*Primary Examiner*—Herbert Goldstein
*Attorney, Agent, or Firm*—Cushman, Darby & Cushman

[57] ABSTRACT

An apparatus for measuring the flow rate of a gas wherein resistance wires whose resistance value changes in accordance with temperature are arranged in a flow rate measuring tube providing a path of a gas to be measured, a voltage is applied to the resistance wires to detect the change in resistance value of the resistance wires due to the change in temperature thereof in accordance with the gas flow rate, and the flow rate of the gas is measured. In order to support the resistance wires in the flow rate measuring tube, the support members for supporting the resistance wires have respectively two support rods provided with grooves at positions corresponding to the turning points of the resistance wires wound thereon so that the resistance wires are supported stably lying in the grooves.

6 Claims, 21 Drawing Figures

GAS FLOW RATE MEASURING APPARATUS

BACKGROUND OF THE INVENTION

The present invention relates to a gas flow rate measuring apparatus useful for measuring the flow rate of the intake air for the engine or an like.

In a of fuel injection type engine, the intake air flow rate is measured and the fuel commensurate with the measured amount of air is supplied by injection into the engine. A well known intake air flow rate measuring apparatus of this type used for the engine comprises a flow rate measuring tube in the intake manifold of the engine, a platinum resistance wire for an electric heater disposed in the tube, a pair of platinum temperature dependent resistance wires also disposed within the tube, and means for measuring the flow rate of the intake air (gas to be measured) in response to an output signal from the resistance wires. This conventional apparatus essentially has an advantage that the flow rate of the gas can be measured accurately with a compact and simple construction.

In this device, it is effective to hold the resistance wires in the measuring tube by winding the wires on a support made of an insulating material. By doing so, each resistance wire is prevented from breaking due to vibrations or backfire of the engine.

If the resistance wires are wound on the support in simple manner, however, the relative position of the resistance wires with the support are varied on the one hand and the resistance wires may be displaced by the wind pressure caused by the backfire on the other hand. The displacement of these resistance wires very undesirably deteriorates the accuracy of flow rate measuring.

SUMMARY OF THE INVENTION

The present invention has been developed in view of the above-mentioned shortcomings of the conventional apparatuses, and the object thereof is to provide a gas flow rate measuring apparatus in which the resistance wires are not varied with respect to the support or the resistance wires are not displaced by strong wind pressure, thus always making possible accurate measuring of the flow rate.

According to the present invention, there is provided a gas flow rate measuring apparatus in which the support has a plurality of grooves along which the resistance wires are wound thereby fixing the position of the wires.

According to another aspect of the present invention, the above-mentioned construction of the resistance wires fixed in position by being wound along the grooves formed on the support remarkably improves the production efficiency of the electric heater and the temperature-dependent resistance wires on the one hand and greatly reduces the product variations on the other hand, thus conspicuously contributing to the improvement of the industrial production of the apparatus. Another great advantage of the present invention is that the resistance wires are not displaced by the wind pressure which may be applied thereto abruptly by backfire or the like, thus making possible always accurate measuring of the flow rate.

DESCRIPTION OF THE PREFERRED EMBODIMENTS

The present invention will be described below with reference to the embodiments shown in the drawings.

Figures 1, 2, 3:
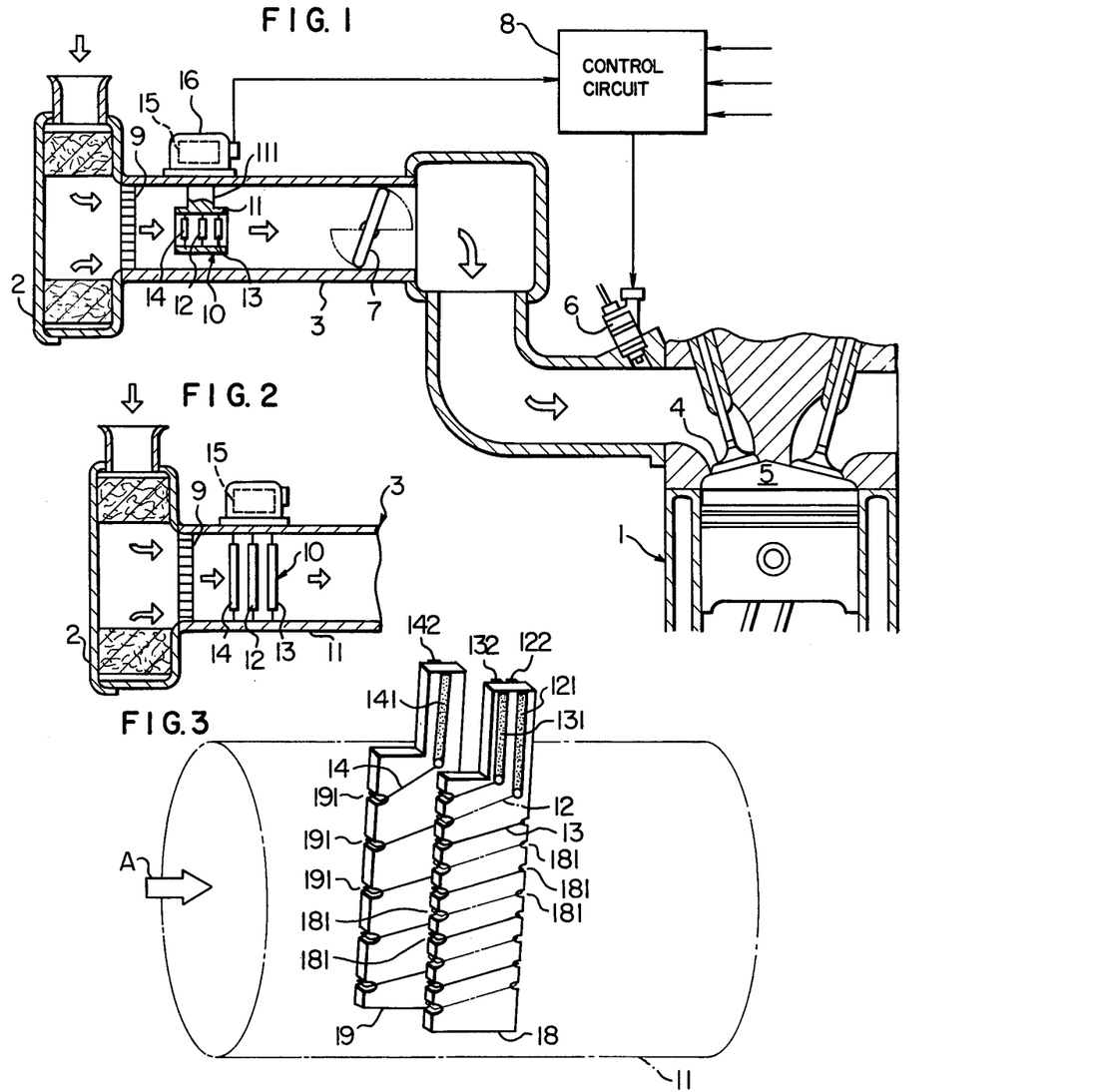
FIG. 1 shows a construction of the engine equipped with the apparatus according to the present invention.
FIG. 2 is a diagram showing a construction of the essential parts according to a modification of the apparatus shown in FIG. 1.
FIG. 3 is a perspective view of an embodiment of the sensor included in the apparatus according to the present invention.

An example of the fuel injection and spark ignition type of engine having a flow rate measuring apparatus according to the present invention is shown in FIG. 1. In the engine 1 shown in the drawing, the air for combustion is introduced to a combustion chamber 5 through an air cleaner 2 and an intake manifold 3 when an intake valve 4 is open. The fuel is supplied by injecting it from an electromagnetic fuel injection valve 6 mounted in the intake manifold 3. The flow rate of the intake air is controlled by operating a throttle valve 7 mounted in the intake manifold 3. The amount of fuel injection is regulated in principle to a level commensurate with the air flow rate or to a corrected level thereof if necessary by changing the operating time of the injection valve 6 by means of the control unit 8.

A flow adjusting grid 9 is provided directly downstream of the air cleaner 2 of the intake manifold 3. The grid 9 has a function to adjust or put in order the flow of the intake air thereby to improve the flow rate measuring accuracy of the flow rate measuring apparatus described below.

In the intake system of the engine 1 such as the above, a sensor of the flow rate measuring apparatus according to the present invention is disposed between the throttle valve 7 and the grid 9 in the intake manifold 3. This apparatus 10 is such that the intake air flow rate for the engine 1 is measured and an electrical signal corresponding to the measurement is applied to the control unit 8. The apparatus 10 comprises a cylindrical flow rate measuring tube 11, an electric heater resistance wire 12 heated by power conduction, first and second temperature-sensitive resistance wires 13 and 14 whose resistance values change in response to change of the temperature, a measuring circuit 15 and first and second support members described later.

The flow rate measuring tube 11 is secured to a support 111 between the grid 9 and the throttle valve 7 of the intake manifold 3 parallelly with the axis of the intake manifold 3. The resistance wires 12, 13 and 14 are held within the measuring tube 11 while being wound on the first and second support members in the manner mentioned later, and connected to the measuring circuit 15. The measuring circuit 15 is housed in the case 16, which is mounted on the outer wall of the intake manifold and connected to the control unit 8.

Instead of forming the flow rate measuring tube 11 in a cylindrical form, it is possible to use a part of the intake manifold 3 also for the flow rate measuring tube 11 as shown in FIG. 2.

A specific construction for holding the resistance wires 12, 13 and 14 is shown in FIG. 3. The resistance wires 12 to 14 are made of platinum. If required, the resistance wires are coated with an insulating film of an electrically insulating material several $\mu$ meter (micrometer) thick to protect them from contamination by impurities or the like.

First and second support members 18 and 19 in the tabular form or in the form of substantially rectangular plates are used for holding the resistance wires. The support members 18 and 19 are made of an electrically insulating material such as ceramics or synthetic resin, and have a plurality of U-shaped grooves in spaced relation with each other on the sides thereof. Two resistance wires are wound on the first support member 18, and one resistance wire is wound on the second support member 19 as described later so that the grooves 181 and 191 in the number corresponding to the number of turns of the resistance wires are formed in the support members 18 and 19 respectively.

The first tabular support member 18 is wound with the platinum resistance wire 12 (shown by one-dot chain) for the electric heater and the platinum resistance wire making up the first temperature-sensitive resistance wire (shown by solid line) in parallel and alternately with each other along the grooves 181 while being turned at the grooves 181 in a predetermined number of turns. An end of each of these wires is connected to the copper foils 121 and 131 provided on one side of the support member 18, and the other end thereof is connected to the copper foils 122 and 132 on the other side of the support member 18 through the copper foil at the bottom (not shown) of the support member 18, whereby the resistance wires 12 and 13 are applied with a voltage. The platinum wire 14 making up the second temperature-sensitive resistance wire, on the other hand, is wound alone on the second support member 19 through the grooves 191 while being turned at the grooves 191 in a predetermined number of turns. The ends of the resistance wire 14 are connected to the copper foils 141 and 142 and supplied with a voltage therefrom. The second temperature-sensitive resistance wire 14 is selected to be one which has the same temperature-resistance characteristic as the first temperature-dependent resistance wire 13.

In this way, the resistance wires 12, 13 and 14 are wound along the grooves 181 and 191 accurately in position on the support members 18 and 19.

The first and second support members 18 and 19 thus wound with the resistance wires are mounted in the flow rate measuring tube 11 in parallel with the flow of air along the arrow A or in such a manner that the second support member 19 is situated upstream of the first support member 18. In other words, the second temperature-sensitive resistance wire 14 on the second support member 19 is held in the flow rate measuring tube 11 in such a positional relation that the temperature-dependent resistance wire is not thermally affected by the electric heater resistance wire 12 on the first support member 17. The resistance wires are then connected to the measuring circuit 15 by the copper foils.

Figure 4:
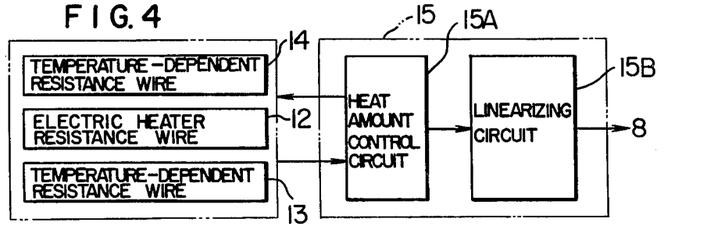
FIG. 4 is a block diagram showing a measuring circuit used in the present invention.

The measuring circuit 15 is comprised of a heat amount control circuit 15A and a linearizing circuit 15B as shown in FIG. 4. In response to an output signal from a bridge including the first and second temperature-sensitive resistance wires 13 and 14, the heat amount control circuit 15A regulates the voltage applied to the electric heater resistance wire 12 and the bridge. The linearizing circuit 15B has a compensating function to make linear the output signal of the heat amount control circuit 15A with respect to the flow rate of intake air.

Figure 5:
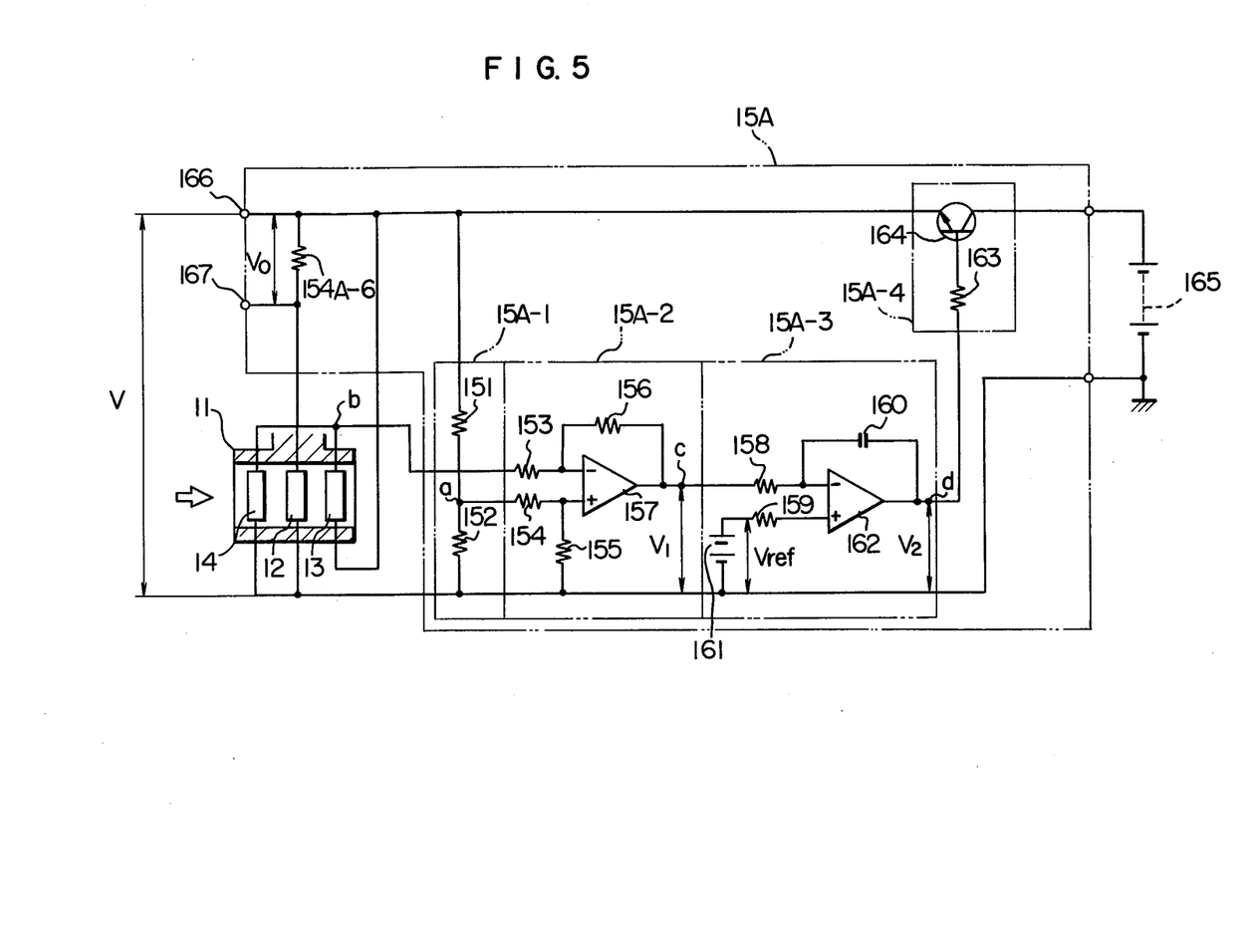
FIG. 5 shows an electrical circuit diagram for the heat amount control circuit shown in FIG. 4.

The configuration of the heat amount control circuit 15A is shown in FIG. 5. As shown, the heat amount control circuit 15A generally comprises a reference resistor 15A-1, a first differential amplifier circuit 15A-2, a second differential amplifier circuit 15A-3, a power amplifier circuit 15A-4 and an output resistor 15A-6.

The reference resistor 15A-1 includes resistors 151 and 152, and together with the first and second temperature-dependent resistance wires 13 and 14 shown in perspective form, makes up a bridge. The first differential amplifier 15A-2 includes input resistors 153, 154, a grounding resistor 155, a negative feedback resistor 156 and an operational amplifier 157 for differentially amplifying the voltages at diagonal points a and b of the bridge and producing the result of amplification at terminal c. The second differential amplifier circuit 15A-3 includes input resistors 158, 159, a capacitor 160, a reference voltage source 161 and an operational amplifier circuit 162 for differentially amplifying the output voltage at the terminal c and the predetermined reference voltage Vref of the reference voltage source 161 and producing the result of amplification at the terminal d. The capacitor 30 is provided for preventing the oscillation of the apparatus. The power amplifier circuit 15A-4 includes a resistor 163 and a power transistor 164. The power transistor 164 is supplied with power from the battery 165. The power amplifier circuit 15A-4 amplifies the output voltage of the second amplifier circuit 15A-3, and applies the output thereof to the electric heater resistance wire 12 and the bridge. The output resistor 15A-6 is for applying a voltage associated with the flow rate of the intake air to the linearizing circuit 15B, and is connected in series with the electric heater resistance wire 12. The terminals 166 and 167 of the output resistor 15A-6 are connected to the linearizing circuit 15B.

Figure 6:
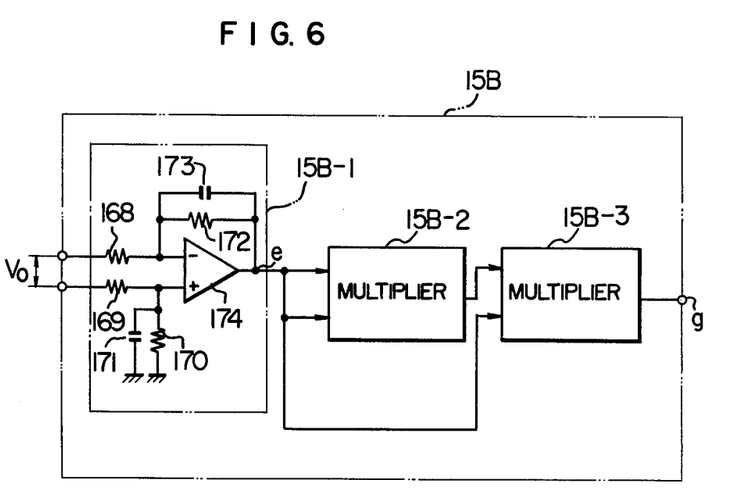
FIG. 6 shows an electrical circuit diagram for the linearizing circuit shown in FIG. 4.

The configuration of the linearizing circuit 15B is shown in FIG. 6. As shown, the linearizing circuit 15B generally includes a differential amplifier circuit 15B-1 and multipliers 15B-2 and 15B-3. The differential amplifier circuit 15B-1 includes input resistors 168, 169, a grounding resistor 170, a grounding capacitor 171, a negative feedback resistor 172, a capacitor 173 and an operational amplifier 174 for differentially amplifying the output voltage of the heat amount control circuit 15A and producing the same at the terminal e. The multipliers 15B-1 and 15B-2 are both of well-known analog type for multiplying two input voltages and producing a voltage corresponding to the product thereof.

The operation of the circuits having the above-mentioned construction will be described. The air of a certain amount determined by the opening of the throttle valve 7 is introduced into the engine 1 from the air cleaner through the intake manifold 3. A predetermined proportion of the entire air passes through the flow rate measuring tube 11 before entering the engine 1.

The second temperature-sensitive resistance wire 14 in a position where it is not affected by the heating of the electric resistance wire 12 in the flow rate measuring tube 11 is affected only by the heat of the second support member 19, namely, the heat of the intake air. The first temperature-sensitive resistance wire 13 which is mounted together with the electric heater resistance wire 12 on the first support member 18, on the other hand, is affected by the temperature of the first support member 18, namely, the temperature raised by the heating of the electric heater resistance wire 12 (which temperature is determined by the air flow rate and the amount of heat generated by the electric heater resistance wire 12).

A temperature difference $\Delta T$ related to the amount of power P (W) supplied to the electric heater resistance wire 12 and the intake air flow rate G (g/sec) thus occurs between the resistance wires 13 and 14, where P, G and $\Delta T$ have the following relation:

$$K_1 \cdot \Delta T = P/G \quad (1)$$

($K_1$: Constant)

The electric resistance value of the resistance wires 13 and 14 changes with the temperature of the air in contact with them respectively, and therefore a potential difference $\Delta V$ determined by the temperature difference $\Delta T$ and the voltage applied to the bridge occurs between the points a and b of the bridge (FIG. 7) as shown below.

$$\Delta V = K_2 \cdot \Delta T \cdot V \quad (2)$$

($K_2$: Constant)

From equations (1) and (2), the relation as shown below is obtained.

$$K_3 \cdot \Delta V/V = P/G \quad (3)$$

($K_3$: Constant)

If the value $\Delta V$ is made constant by controlling the power P supplied to the electric heater resistance wire 12 and the voltage V applied to the bridge, therefore, the relation as shown below between the intake air flow rate G, the power supply P, and the bridge-applied voltage V is obtained.

$$G = K_4 \cdot P \cdot V \quad (4)$$

($K_4$: Constant)

By making the resistance value of the electric heater resistance wire 12 small in comparison with that of the output resistor 15A-6 in FIG. 5 and assuming that the current which flows through the electric heater resistance wire 12 is designated by I, the following equations are obtained.

$$P \approx K_5 \cdot I^2 \quad (5)$$

($K_5$: Constant)

$$V \approx K_6 \cdot I \quad (6)$$

($K_6$: Constant)

Thus the equation (4) may be rewritten as below.

$$G \approx K \cdot I^3 \quad (K: \text{Constant}) \quad (7)$$

$$\approx K' \cdot V^3 \quad (K': \text{Constant}) \quad (8)$$

This shows that the intake air flow rate G is a function of the 3rd power of the current I (or voltage V). Since the equations (7) and (8) are approximations which are not influential for the purpose of measurement, it does not pose any substantial practical problems.

The heat amount control circuit 15A thus maintains the value $\Delta V$ at a constant value by controlling the amount of heat generated by the electric heater resistance wire 12. In other words, with the increase in the flow rate of intake air, the temperature increase of the air heated by the electric heater resistance wire 12 is decreased, so that the temperature difference $\Delta T$ between the first and second temperature dependent resistance wires 13 and 14 decreases, thus decreasing the potential difference $\Delta V$ between the points a and b of the bridge. The output voltage $V_1$ of the first differential amplifier circuit 15A-2 decreases, and the output voltage $V_2$ of the second differential amplifier circuit 15A-3 for generating a voltage according to $V_{ref} - V_1$ increases. The power amplifier circuit 15A-4 increases the current supplied to the electric heater resistance wire 12 thereby to increase the amount of heat. The temperature difference $\Delta T$ between the resistance wires 13 and 14 increases, the potential difference $\Delta V$ between the points a and b of the bridge increases, and when the output voltage $V_1$ becomes equal to the reference voltage $V_{ref}$, the whole system becomes to be balanced and stable but with the bridge unbalanced.

When the flow rate of the intake air decreases, on the other hand, the temperature increase of the air heated by the electric heater resistance wire 12 increases, and the temperature difference $\Delta T$ between the resistance wires 13 and 14 increases, thus increasing the potential difference $\Delta V$. The output voltage $V_1$ of the first differential amplifier circuit 15A-2 increases, and the output voltage $V_2$ of the second differential amplifier circuit 15A-3 decreases, so that the power amplifier circuit 15A-4 decreases the current supplied to the electric heater resistance wire 12, thus reducing the amount of heat. As a result, the temperature difference $\Delta T$ is decreased and the potential difference $\Delta V$ is decreased, so that when the potential difference $\Delta V$ becomes equal to the reference voltage $V_{ref}$, the system and the bridge are stabilized.

In this way, the potential difference $\Delta V$ between the points a and b of the bridge is maintained at the fixed value $V_{ref}$ regardless of the intake air flow rate, thereby establishing equation (7), which shows that the flow rate G of the intake air is a function of the third power of the current I flowing in the electric heater resistance wire 12.

Since the current I flows also in the output resistor 15A-6, the current I is proportional to the terminal voltage $V_0$ of the output resistor 15A-6 while the third power of the voltage $V_0$ is proportional to the flow rate G of the intake air.

The output voltage $V_0$ of the heat amount control circuit 15A is raised to the third power by the linearizing circuit 15B. In other words, the terminal voltage of the output resistor 15A-6 of the heat amount control circuit 15A is amplified by the differential amplifier circuit 15B-1, and the voltage of $A_1 \cdot V_0$ is produced at the terminal e. Reference character $A_1$ shows the amplification factor of the circuit 15B-1. The output voltage $A_1 \cdot V_0$ is applied to the input terminals of the multiplier 15B-2 so that the voltage $A_1^2 \cdot V_0^2$ is produced from the multiplier 15B-2. The voltages $A_1 \cdot V_0$ and $A_1^2 \cdot V_0^2$ are applied to the multiplier 15B-3, which in turn produces the voltage $A_1^3 \cdot V_0^3$.

As a result, the voltage Vg which is proportional to the third power of the voltage $V_0$, namely, which is proportional to the intake air flow rate is produced at the output terminal g of the linearizing circuit 15B.

The voltage Vg is applied to the control unit 8 as a signal indicative of the intake air flow rate G, so that the control unit 8 produces an injection pulse signal for opening the fuel injection valve 6 in response to the particular signal. The engine 1 is thus supplied with air and fuel for making an accurate air-fuel ratio thereby to improve the purification of the exhaust gas, output and fuel efficiency of the engine 1.

In the above-described construction of the apparatus 10 for measuring the intake air flow rate in the manner mentioned above, the resistance wires 12, 13 and 14 are wound on the support members 18 and 19 by way of the grooves 181 and 191 thereof. This construction prevents the variations of the relative position of the resistance wires with respect to the support members on the one hand and prevents the resistance wires from being displaced by the shock waves caused by engine backfire or the like on the other hand. Therefore, the flow rate of intake air may be measured always with high accuracy. The likelihood of the resistance wires being broken is of course eliminated, thus greatly increasing the service life.

The electric heater resistance wire 12 and the first temperature-sensitive resistance wire 13 for receiving the heat from the former are wound on the same support (first support member 18) in close proximity to each other. This construction makes it possible for all the heat of the resistance wire 12 to be transmitted to the resistance wire 13, thus greatly improving the responsiveness and accuracy of the flow rate measurement.

Figure 7:
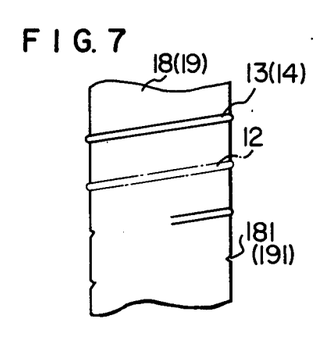
FIGS. 7 and 8 are front views of the essential parts of modifications of the embodiment shown in FIG. 3.
Figure 8:
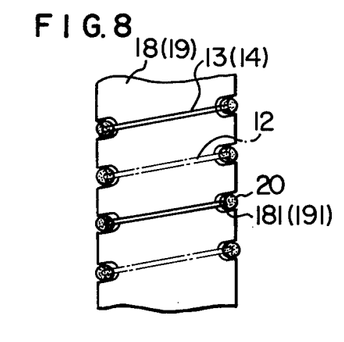

Modifications of the resistance wire supporting structure according to the present invention are shown in FIGS. 7 and 8.

In the modification of FIG. 7, V-shaped grooves 181 and 191 are formed in the support members 18 and 19. In this construction also it is possible to position the resistance wires 12, 13 and 14 accurately and fix them in the same manner as in the above-mentioned case. The modification of FIG. 8, on the other hand, is such that the contacts between the grooves 181 and 191 of the support members 18 and 19 and the resistance wires 12 to 14 are secured by the securing member 20 in order to reinforce the fixing of the resistance wires.

Figures 9A, 9B:
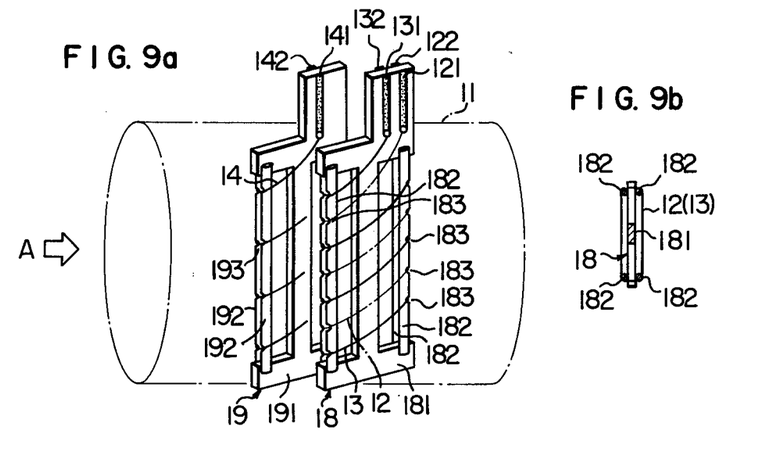
FIGS. 9a and 9b are perspective views of another embodiment of the sensor of the apparatus according to the present invention.

Another embodiment of the resistance wire support structure according to the present invention is shown in FIGS. 9a and 9b.

The support members 18 and 19 are made of tabular support plates 181 and 191 of an electrically insulating material such as ceramics, synthetic resin or glass and an insulating material similar thereto, or cylindrical support rods 182 and 192 with the surface thereof covered with an insulating material. The support plates 181 and 191 are I shaped and have four support rods 182 and 192 fixed thereto. In other words, two of the support rods 182 and 192 are arranged to bridge the upper and lower ends on the front side and the other two of the support rods 182 and 192 are arranged to bridge the upper and lower ends of the back side of the support plates 181 and 191.

The platinum resistance wire 12 and the platinum resistance wire 13 are wound in a predetermined number of turns in parallel in proximity to each other on the first support member 18 by being held on the four support rods 182, namely, in contact with only the four support rods 182. One end of each of the platinum resistance wires 12 and 13 are connected to the copper foils 121 and 131 provided on the surface of the support plate 181 of the first support member 18, and the other end thereof is connected to the copper foils 122 and 132 provided on the back side of the support plate 181, so that the resistance wires 12 and 13 are applied with a voltage. The platinum resistance wire 14, on the other hand, is wound in a predetermined number of turns in contact with the four support rods 192 alone on the second support member 19, and the ends of the platinum resistance wire 14 are connected to the copper foils 141 and 142 through which a voltage is adapted to be applied thereto. Each of the support rods 182 and 192 has a plurality of grooves 183 and 193, along which the resistance wires 12, 13 and 14 are wound thereby to prevent the displacement of the resistance wires with respect to the support members. At the same time, or apart from this, the contacts between the resistance wires and the supports are fixed by a bonding agent.

In the embodiment of FIGS. 9a and 9b, the resistance wires are wound only in contact with the support rods so that the contact area between the resistance wires and the support members is minimized thereby to reduce the affection of the heat capacity of the support member on the resistance wires and to improve the accuracy of the measurement of the flow rate.

Modifications of the embodiment of FIGS. 9a and 9b are shown in FIGS. 10a, 10b to 13a and 13b.

Figure 10A:
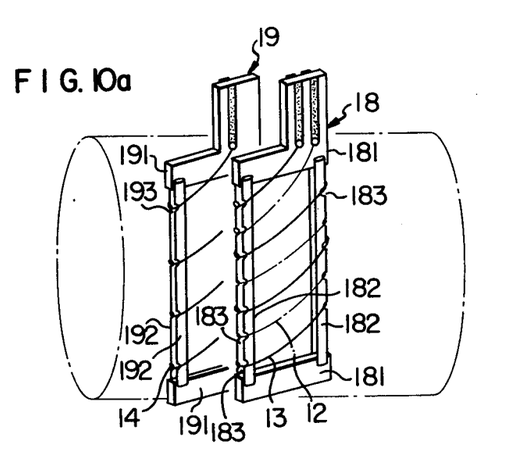
FIGS. 10a, 10b, 11a, 11b, 12a, 12b, 13a and 13b are perspective views of modifications of the embodiment shown in FIGS. 9a and 9b.
Figure 10B:
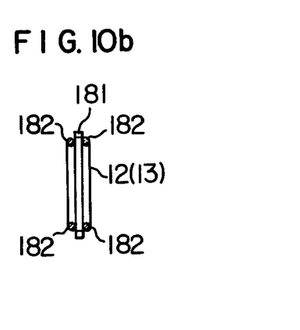
Figure 11A:
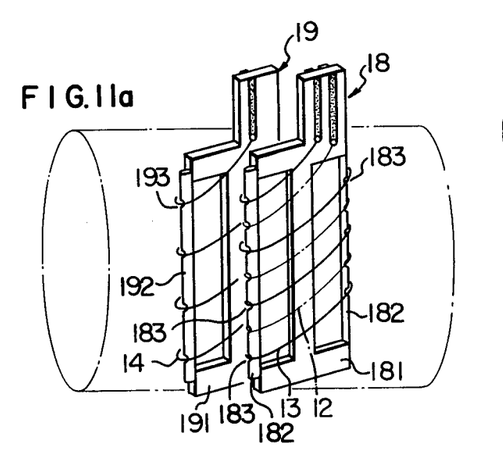
Figure 11B:
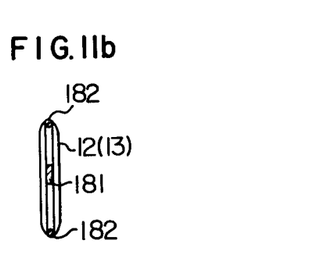
Figure 12A:
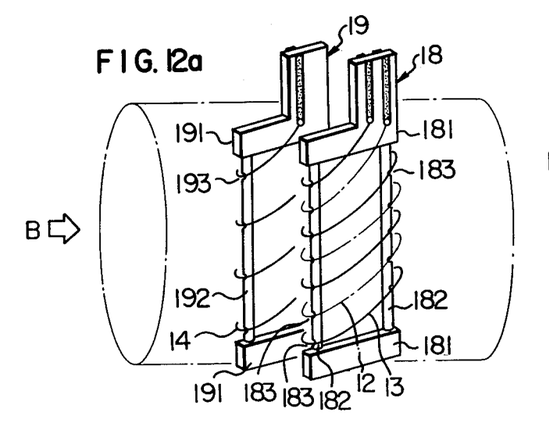
Figure 12B:
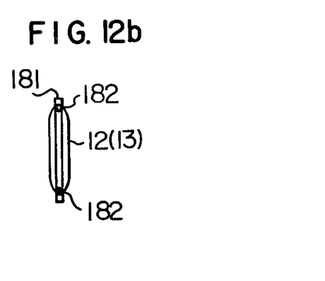
Figures 13A, 13B:
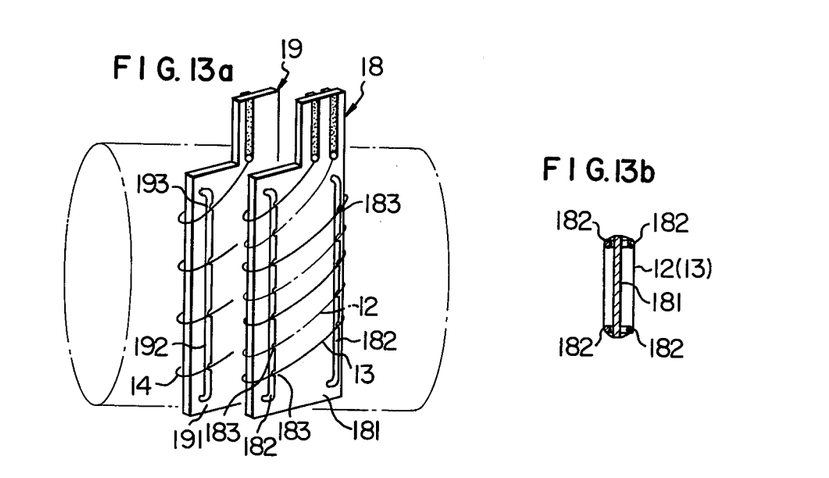

In the modification of FIGS. 10a and 10b, the support plates 181 and 191 of the support members 18 and 19 are separated into upper and lower parts and connected to each other by four support rods 182 and 192. The modification of FIGS. 11a and 11b, on the other hand, is such that a total of two support rods 182 and 192, one each for the support members 18 and 19, are fixed on the end of the support plates 181 and 191 similar to those in FIGS. 9a and 9b. Further, in the modification of FIGS. 12a and 12b, the support plates 181 and 191 separated as in FIG. 10 are connected to the support rods 182 and 192 of the support members 18 and 19. Furthermore, the modification of FIGS. 13a and 13b comprises support rods 182 and 192, two each on the front and back of the parallelepiped support plates 181 and 191 of the support members 18 and 19.

In any of the above-described constructions, a plurality of grooves 183 and 193 are formed in the support rods 182 and 192 so that the resistance wires 12, 13 and 14 may be wound through these grooves, thus making it possible to wind the resistance wires 12, 13 and 14 selectively in contact with the support rods 182 and 192 only, resulting in the same effect and function as the modification of FIGS. 9a and 9b.

Figure 14:
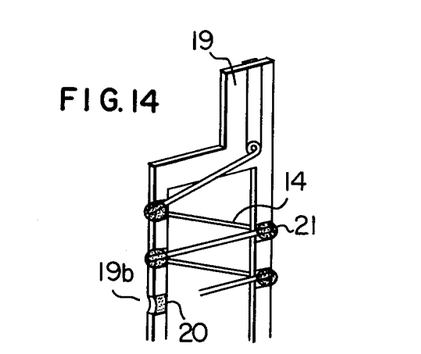
FIG. 14 shows still another embodiment of the sensor of the apparatus according to the present invention.

Still another embodiment of the resistance wire support structure according to the present invention is shown in FIG. 14. In the embodiment of FIG. 14 where the detail of construction of winding the resistance wires on the support members is shown with reference to the second temperature-sensitive resistance wire 14, the electric heater resistance wire 12 and the first temperature-dependent resistance wire 13 are wound on the first support member 18 in the same manner as in the foregoing embodiment.

As shown in the drawing, the resistance wire 14 is in contact with the ends of the second support member 19, where the resistance wire 14 is turned to be wound on the second support member 19 made of an electrical insulating material. At the parts other than the turning point, the resistance wire 14 is not in contact with the support member 19 but is relieved from the surface of the support member 19. The surface of the end of the support member 19 to be in contact with the resistance wire 14 is provided with an electrode 20 of nickel, gold, silver, copper or the like beforehand, so that the resistance wire 14 is wound in contact with this electrode 20. The contact between the resistance wire 14 and the electrode 20 fixedly carries a conductive securing member 21 of solder or silver paste, whereby the contact is protected on the one hand and the resistance wire 14 is kept connected with the electrode 20 on the other hand. In the embodiment of FIG. 14, that part of the support member 19 which is in contact with the resistance wire 14 is formed with a groove 19b to fix the resistance wire 14 in position, whereby the winding workability of the resistance wire 14 is improved while at the same time reducing the variations of position of the resistance wire 14.

In the case where the contact between the resistance wire and the support member is secured by the conductive securing member 21, the particular portion is shorted by the conductive securing member 21 and does not substantially participate in the transfer and receipt of heat, with the result that dust or dirt easily attaches to the contact. In spite of this, the transfer and receipt of heat is not affected, thus maintaining an always highly accurate measurement of the flow rate.

Figure 15A:
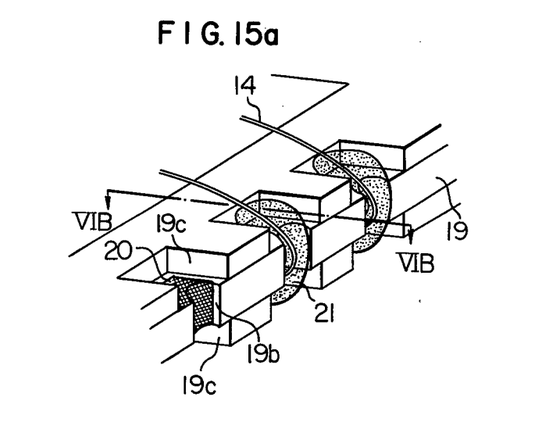
FIGS. 15a and 15b are perspective views of the essential parts of a modification of the embodiment shown in FIG. 14.
Figure 15B:
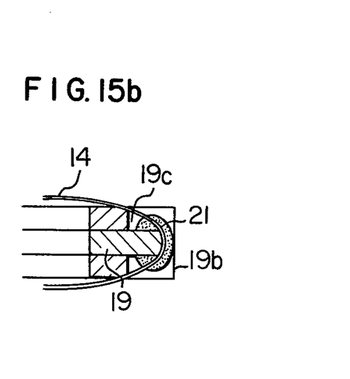

A modification of the embodiment of FIG. 14 is shown in FIGS. 15a and 15b. In addition to the groove 19b of the support member 19, a stepped recess 19c is formed on the ends or the sides of the groove 19b. This construction enables the securing member 21 to be contained in the groove 19b and the recess 19b and the recess 19c so that the turbulence of air which otherwise might be caused by the securing member 21 is prevented thereby to improve the accuracy of measurement of the flow rate.

Although the embodiments described above concerns an apparatus including the electric heater resistance wire 12, and first and second resistance wires 13 and 14 for detection of the flow rate, the present invention may be applied with equal effect to what is called the hot-wire anemometer for detecting the gas flow rate with a single temperature-sensitive resistor.

We claim:

1. A gas flow rate measuring apparatus comprising:
a flow rate measuring tube through which a gas under measurement flows;
support members arranged in said flow rate measuring tube and temperature-sensitive resistance wires wound on said support members, each of said support members having a front support rod and a rear support rod, at least a portion of the space between each pair of said front and rear support rods being vacant, each of said support rods having grooves disposed thereon, said resistance wires being wound on said pairs of said front and rear support rods, respectively, and lying in said grooves of said front and rear support rods; and
a measuring circuit for applying a voltage to said resistance wires and measuring the flow rate of said gas under measurement on the basis of output signals from said resistance wires, said output signals being responsive to the change of the resistance value of said resistance wires caused by a change of the flow rate of said gas under measurement.

2. A gas flow rate measuring apparatus according to claim 1, wherein each of said support members is separated into an upper portion and a lower portion which are connected to each other by said front and rear support rods.

3. A gas flow rate measuring apparatus according to claim 1, wherein each of said support members has a generally "I" shape and said front support rod and rear support rod are attached to each of said support members across open ends of said "I" shape, respectively.

4. A gas flow rate measuring apparatus comprising:
a gas flow rate measuring apparatus comprising:
a flow rate measuring tube through which a gas to be measured flows;
support members arranged in said flow rate measuring tube and resistance wires wound on said support members, the resistance value of said resistance wires changing in accordance with temperature, said support members including grooves at parts thereof corresponding to turning points of said resistance wires wound on said support members, said resistance wires being wound on said support members and lying in said grooves with the contact between said support members and said resistance wires being secured by a conductive securing member; and
a measuring circuit for applying a voltage to said resistance wires and measuring the flow rate of said gas to be measured, on the basis of an output signal produced from said resistance wires, said output signal being responsive to the change of the resistance value of said resistance wires.

5. A gas flow rate measuring apparatus according to claim 4, wherein each of said support members is of a tabular shape.

6. A gas flow rate measuring apparatus according to claim 4, wherein stepped recesses are provided on both sides of each of said grooves of said support members thereby to form a space for containing said conductive securing member therewith.

* * * * *